Patented Aug. 11, 1931

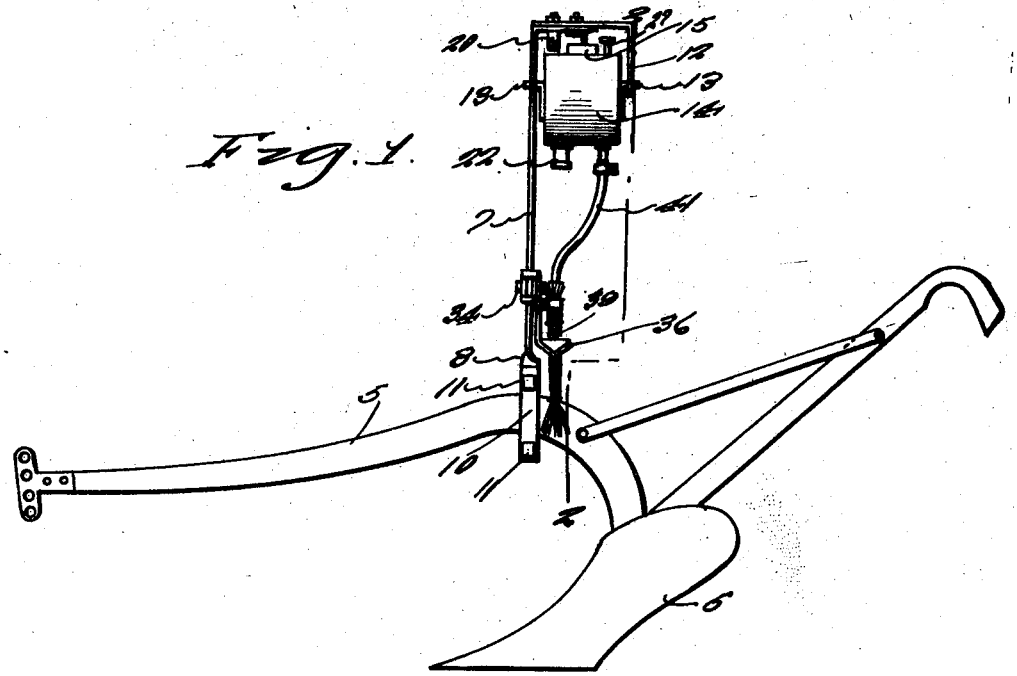
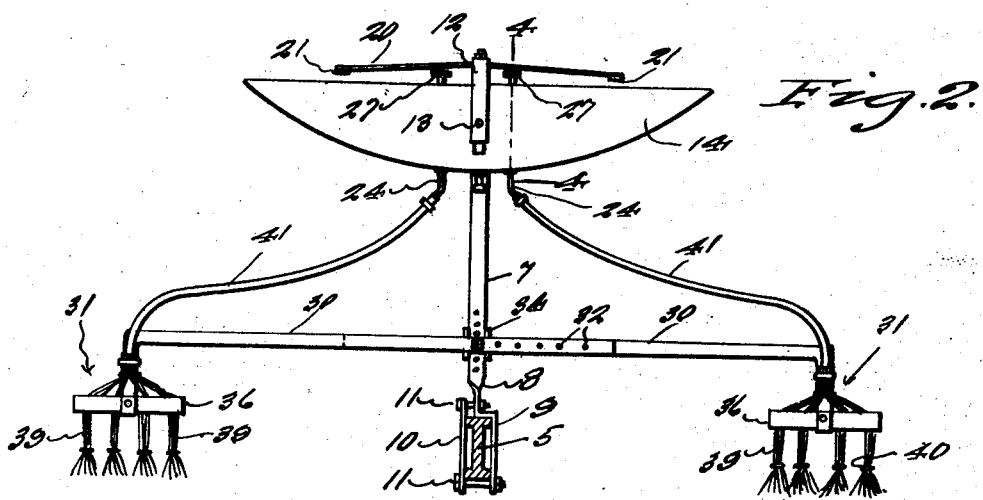
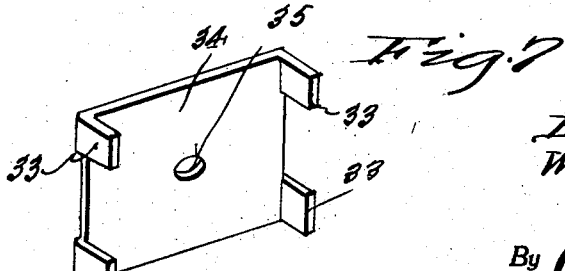

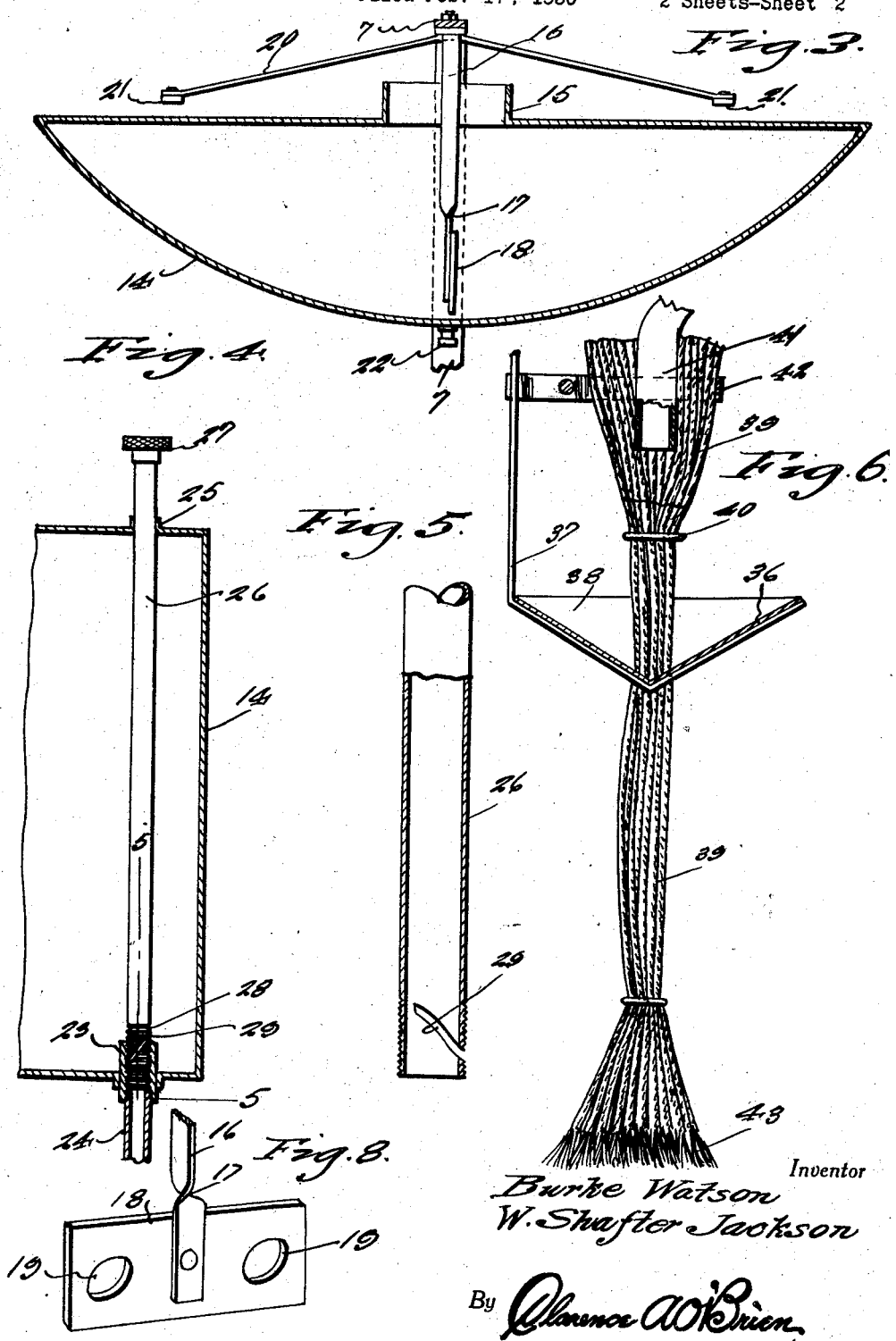

1,818,369

UNITED STATES PATENT OFFICE

BURKE WATSON AND WILLIAM SHAFTER JACKSON, OF SUMTER, SOUTH CAROLINA

POISON DISPENSER FOR CULTIVATOR PLOWS

Application filed February 17, 1930. Serial No. 429,128.

This invention appertains to new and useful improvements in vermin destroying means for use on cultivating machinery.

The principal object of the invention is to provide a poison dispensing attachment for cultivator plows which will efficiently serve to apply poison to plants to exterminate vermin thereon.

Another important object of the invention is to provide a poison applying attachment for cotton cultivating plows for effectively exterminating boll weevils.

During the course of the following specification, numerous other important objects and advantages of the invention will readily become apparent to the reader.

In the drawings:—

Figure 1 represents a side elevational view of the novel attachment on a cultivator plow.

Fig. 2 represents a vertical sectional view taken substantially on the line 2—2 of Fig. 1.

Fig. 3 represents a longitudinal sectional view through the reservoir.

Fig. 4 represents a fragmentary vertical sectional view taken substantially on the line 4—4 of Fig. 2.

Fig. 5 represents a fragmentary vertical sectional view taken substantially on the line 5—5 of Fig. 4.

Fig. 6 is a fragmentary vertical sectional view through one of the poison applying units.

Fig. 7 is a perspective view of the clamp plate.

Fig. 8 is a fragmentary perspective view of the mixing paddle for the reservoir.

Referring to the drawings wherein like numerals designate like parts, it can be seen that the attachment is to be mounted on the beam 5 of a plow 6. A hand type of plow is enclosed in Fig. 1, but of course various other types of plows may have this novel attachment secured thereto without in any manner departing from the scope of this invention.

In Fig. 2 it can be seen that the attachment includes an elongated upstanding post 7 which is twisted at its lower portion as at 8 and bent laterally and downwardly as at 9, for disposition against one side of the beam 5. A complementary strap 10 is secured to the beam 5 by adjusting bolts to hold the plate 10 and portion 9 of the post 7 tightly against the beam 5.

The upper end of the post 7 is disposed laterally toward the rear of the beam 5, and has a depending leg 12. The lower end of the leg 12 has an opening therein directly opposite an opening in the post 7, and these openings are for receiving the trunnions 13—13 at the intermediate portion of the reservoir 14. In this manner, the reservoir is supported in a position transverse of the beam 5 and as shown clearly in Fig. 3, the bottom wall thereof is curved throughout its entire longitudinal extent, the same at its ends merging with the plane top wall thereof.

This top wall has an opening at the intermediate portion thereof and an upstanding flange 15 surrounds this opening. The rearwardly disposed upper end of the post 7 has the upper end of a depending arm 16 secured thereto, the lower end of which is twisted as at 17 and has a paddle blade 18 secured thereto. The paddle blade is provided with openings 19 therein through which the poison mixture within the reservoir may flow, during the rocking motion of the reservoir while the plow is in operation.

It can also be seen that an elongated bar 20 is secured at its intermediate portion to the laterally disposed portion of the post 7, with each portion beyond the said laterally bent portion of the post 7 disposed downwardly, to terminate in close spaced relation with respect to the top wall of the reservoir, when the reservoir is in a level position.

The under side of the bar 20 at each end thereof is provided with a bumper block 21 of some suitable resilient material for engagement with the reservoir to limit the rocking motion thereof. A drain outlet 22 is provided in the bottom of the reservoir, and obviously the reservoir may be filled in the opening through the top wall thereof hereinbefore mentioned.

The bottom curved wall of the reservoir is provided at its intermediate points with a pair of internally threaded sockets 23, each of which receives the upper externally threaded end of a nipple 24. It will also be noted that the top wall of the reservoir immediately above each socket 23 is provided with an opening, surrounded by a collar 25.

Slidably and rotatably disposed through each of these collars 25 is an elongated shaft 26, provided with a knurled head 27 at its upper end. The lower end of each of these shafts 26 is hollow and provided with external threads 28, whereby this end of the shaft may be flared into a corresponding pocket 23.

As is clearly shown in Fig. 5, the threaded portion 28 of each shaft 26 is provided with an obliquely disposed slot (that is oblique with respect to the longitudinal axis thereof), denoted by numeral 29, and obviously by feeding the shaft 26 outwardly, more and more of the slot 25 may be exposed to regulate the amount of poison liquid to be dispensed through the underlying nipple 24.

As is clearly shown in Fig. 2, a pair of cross bars 30—30 are employed for supporting the poison distributing units, each denoted generally by numeral 31.

The inner end of each of these bars is provided with longitudinally spaced openings 32, and these perforated ends of the bars are disposed in overlapping relation across the lower portion of the post 7 and between the spaced legs 33 on the clamp plate 34.

This clamp plate is provided with a central opening 35. By disposing a bolt thru registering openings 32 of the bars 30—30 and thru the opening 35 of the clamp plate, and applying a nut thereto, these parts may be all firmly secured together in the position shown in Fig. 2.

Each of the portion distributing units 31 includes a trough 36 supported by a depending arm 37 at the outer end of the corresponding bars 30. The trough 36 is provided with a wall 38 at each end thereof, so that the trough may receive and retain any of the poison liquids which fall from the strands 39 forming the applicator.

This applicator is tied together as at 40, and at as many points as is desired, and as clearly disclosed in Figs. 2 and 6, the upper ends of the strands are disposed around the lower end of the corresponding hose 41, and secured thereto by the clamp rings 42, carried by the arms 37.

The upper end of each of the hose 41 receives the lower end of its corresponding nipple 24, so that liquid discharging through the corresponding nipple 24 will flow through the particular hose to the corresponding applicator. The lower end of the applicator has its strand frayed as at 43 and as is apparent in Fig. 6, the applicator is disposed through a centrally located opening in the trough 36.

Obviously, by properly controlling the valve shaft 46, flow to the applicators may be well regulated, and in using the plow to cultivate, the applicators will wipe against the plants, and apply the poison liquid thereto to exterminate vermin thereon.

It can also be seen that the plow rocking from one side to the other, will result in the rocking of the reservoir, and this rocking of the reservoir, and the feeding of the liquid therein against the paddle 18 will result in the continuous mixing of the liquid to prevent any sediment taking place.

It is to be understood that while the foregoing specification has been definite, the same has been explained in specific details, and it is to be understood that numerous changes in the shape, size, and materials may be resorted to without departing from the spirit and scope of the invention as claimed hereinafter.

Having thus described our invention, what we claim as new is:—

1. A poison applicator of the class described comprising a vehicle carried reservoir, a vehicle carried trough having an opening in its bottom, an upright on the trough, a horizontal supporting member connected with the upright, a plurality of strands having their upper ends connected with the supporting member and passing through the hole in the trough, and a tube leading from the reservoir into the upper end of the group of strands.

2. A poison applicator of the class described comprising an upright, means for attaching the lower end of the upright to an agricultural implement, the upper end of the upright being of inverted U-shape, a reservoir having trunnions at its ends which are journaled in the limbs of the U-shaped part, a member depending from the bight of the U-shaped part into the reservoir, a cross piece having holes therein connected in the lower end of said member, a cross bar connected to the lower part of the upright, a trough supported at each end of the cross bar, and having a hole in its bottom, a group of strands of fabric passing through the hole in each trough, means for connecting the upper end of each group to the cross bar, a tube connecting the reservoir to the top of each group of strands, the lower end of each tube extending to the upper end of each group and valve means for controlling the flow of liquid from the reservoir into each tube.

In testimony whereof we affix our signatures.

BURKE WATSON.
WILLIAM SHAFTER JACKSON.